US010837595B2

(12) United States Patent
Liang

(10) Patent No.: US 10,837,595 B2
(45) Date of Patent: Nov. 17, 2020

(54) SYSTEMS AND METHODS FOR A FLIPOUT PHONE HOLDER AND STAND

(71) Applicant: NITE IZE, INC., Boulder, CO (US)

(72) Inventor: Robin Liang, Guangdong (CN)

(73) Assignee: NITE IZE, INC., Boulder, CO (US)

( * ) Notice: Subject to any disclaimer, the term of this patent is extended or adjusted under 35 U.S.C. 154(b) by 97 days.

(21) Appl. No.: 15/835,213

(22) Filed: Dec. 7, 2017

(65) Prior Publication Data
US 2019/0178438 A1 Jun. 13, 2019

(51) Int. Cl.
*F16M 11/40* (2006.01)
*F16M 13/02* (2006.01)
(Continued)

(52) U.S. Cl.
CPC ............ *F16M 11/40* (2013.01); *F16M 11/04* (2013.01); *F16M 11/041* (2013.01);
(Continued)

(58) Field of Classification Search
CPC .. F16M 11/40; F16M 11/38; F16M 2200/028; F16M 11/04; F16M 11/16; F16M 13/02; F16M 11/10; F16M 11/2021; F16M 11/041; F16M 13/04; H04M 1/04; H05K 5/023; H05K 5/0204; A45F 5/00; A45F 2200/0516; A45F 2200/0525; A47B 23/043; A47B 23/044; Y10T 403/32081; Y10T 403/32254; Y10T 403/32401; F16B 5/008; A45C 2200/15; H04B 2001/3861
USPC ........ 248/160, 688, 97, 460, 462, 463, 447, 248/188.6; 108/115; 40/754; 294/142, 294/25; 224/217–218; 16/422, 426; 403/3, 4, 220
See application file for complete search history.

(56) References Cited

U.S. PATENT DOCUMENTS 2,449,492 A * 9/1948 Long .................... A47B 23/043
248/447
7,626,634 B2 * 12/2009 Ohki ..................... F16M 11/10
248/207.1
(Continued)

FOREIGN PATENT DOCUMENTS

WO    WO 2013050065 A1    4/2013

OTHER PUBLICATIONS

International Search Report and Written Opinion dated Feb. 26, 2019 issued in corresponding PCT App. No. PCT/US18/64309 (8 pages).
(Continued)

Primary Examiner — Ingrid M Weinhold
(74) Attorney, Agent, or Firm — Haynes and Boone, LLP

(57) ABSTRACT

A device holder includes a first body portion and a second body portion. The device holder further includes a spring arm connecting the first and second body portion, the first body portion having a first recess that receives a first portion of the spring arm, the second body portion having a second recess that receives a second portion of the spring arm, the first and second body portion having a first configuration where the spring arm is in the first and second recess and a second configuration where the spring arm is out of the first recess. In order to change from the first configuration to the second configuration, the spring arm compresses.

21 Claims, 6 Drawing Sheets

(51) Int. Cl.

| | | |
|---|---|---|
| *H04M 1/04* | (2006.01) | |
| *F16M 11/16* | (2006.01) | |
| *F16M 11/04* | (2006.01) | |
| *F16M 13/04* | (2006.01) | |
| *F16M 11/10* | (2006.01) | |
| *F16M 11/20* | (2006.01) | |
| *F16M 11/38* | (2006.01) | |

(52) U.S. Cl.
  CPC ............ *F16M 11/10* (2013.01); *F16M 11/16* (2013.01); *F16M 11/2021* (2013.01); *F16M 11/38* (2013.01); *F16M 13/02* (2013.01); *F16M 13/04* (2013.01); *H04M 1/04* (2013.01)

(56) References Cited

U.S. PATENT DOCUMENTS

| | | | | |
|---|---|---|---|---|
| D659,147 S | * | 5/2012 | Hu | D14/447 |
| 8,191,838 B2 | * | 6/2012 | Carter | B60R 11/02 |
| | | | | 16/367 |
| D668,256 S | * | 10/2012 | Matteo | D14/447 |
| 8,844,098 B2 | * | 9/2014 | Karmatz | B25G 1/102 |
| | | | | 16/422 |
| 9,103,487 B2 | * | 8/2015 | Hale | G03B 17/566 |
| 9,267,638 B2 | * | 2/2016 | Le Gette | F16M 11/04 |
| 9,364,081 B1 | * | 6/2016 | Haymond | A47B 23/044 |
| 9,470,358 B2 | * | 10/2016 | Le Gette | F16M 11/10 |
| 9,647,714 B2 | | 5/2017 | Hirsch | |
| 9,836,092 B2 | * | 12/2017 | Miao | F16M 13/005 |
| D833,446 S | * | 11/2018 | Elder | D14/447 |
| 2006/0038104 A1 | * | 2/2006 | Choi | F16M 11/041 |
| | | | | 248/370 |
| 2006/0043253 A1 | * | 3/2006 | Huang | F16M 11/10 |
| | | | | 248/371 |
| 2007/0062089 A1 | * | 3/2007 | Homer | G06F 1/1616 |
| | | | | 40/754 |
| 2011/0031287 A1 | * | 2/2011 | Le Gette | F16M 11/04 |
| | | | | 224/101 |
| 2011/0253850 A1 | * | 10/2011 | Bau | H04M 1/0214 |
| | | | | 248/176.3 |
| 2012/0106054 A1 | * | 5/2012 | Royz | F16M 11/10 |
| | | | | 361/679.3 |
| 2012/0168577 A1 | * | 7/2012 | Cheng | F16M 11/105 |
| | | | | 248/176.3 |
| 2012/0329534 A1 | | 12/2012 | Barnett et al. | |
| 2013/0009024 A1 | | 1/2013 | Liu | |
| 2013/0095217 A1 | * | 4/2013 | Stafford | A23F 5/262 |
| | | | | 426/433 |
| 2013/0306807 A1 | | 11/2013 | Liang et al. | |
| 2014/0097306 A1 | | 4/2014 | Hale et al. | |
| 2014/0191106 A1 | * | 7/2014 | Le Gette | F16M 11/041 |
| | | | | 248/688 |
| 2014/0326852 A1 | * | 11/2014 | Le Gette | F16M 11/10 |
| | | | | 248/688 |
| 2015/0159755 A1 | | 6/2015 | Whitlow et al. | |
| 2015/0250357 A1 | * | 9/2015 | Zhitnitsky | A47J 36/34 |
| | | | | 248/423 |
| 2017/0192454 A1 | * | 7/2017 | Miao | F16M 13/005 |
| 2018/0041237 A1 | * | 2/2018 | Mody | H04B 1/3877 |
| 2018/0146078 A1 | * | 5/2018 | Shin | F16B 1/00 |
| 2018/0167498 A1 | * | 6/2018 | Drakos | F16M 11/105 |

OTHER PUBLICATIONS

Walters, J. "Nite Ize FlipOut Review I wish I would have thought of that"; MacSources; Article [online], Jan. 29, 2018 [retrieved Jan. 31, 2019]. Retrieved from the internet: <URL: https://macsources.com/nite-ize-flipout-review-wish-thought/>; entire document.

* cited by examiner

SYSTEMS AND METHODS FOR A FLIPOUT PHONE HOLDER AND STAND

BACKGROUND

Mobile phones and other handheld devices are commonplace. These mobile devices are at times have a form factor that is sleek. Although this form factor makes the devices visually pleasing, it may make them difficult to hold, causing them to frequently be dropped. Also, when viewing a device in a hands free manner, the mobile device will lay flat and make the device difficult to view. For these reasons, it is desirable to have a device that improves the user's ability to hold and view the mobile device that is always available and has minimal impact on the device's form factor and holdability.

BRIEF SUMMARY

In one embodiment, a device holder includes a first body portion and a second body portion. The device holder further includes a spring arm connecting the first and second body portion, the first body portion having a first recess that receives a first portion of the spring arm, the second body portion having a second recess that receives a second portion of the spring arm, the first and second body portion having a first configuration where the spring arm is in the first and second recess and a second configuration where the spring arm is out of the first recess. In order to change from the first configuration to the second configuration, the spring arm compresses. Optionally, spring arm has a first, second, and third portion, the first and second portion separated by a first cutout area and the second and third portion separated by a second cutout area, such that when the spring arm compresses the first, second, and third portion push into the first and second cutout area. Alternatively, the first portion of the spring arm has a first protrusion and a corresponding portion of the first body portion has a first concave area, such that the first protrusion extends into the first concave area when the first and second body portion are in the first configuration and the first protrusion and a width of the spring arm is too wide to pass a first edge of the first recess without compression of the spring arm. In one alternative, the spring arm is shaped like a compressed S. In another alternative, the third portion of the spring arm has a second protrusion and a corresponding portion of the first body portion has a second concave area, such that the second protrusion extends into the second concave area when the first and second body portion are in the first configuration and the second protrusion and the width of the spring arm is too wide to pass a second edge of the first recess without compression of the spring arm. Alternatively, the first portion of the spring arm has a third protrusion and a corresponding portion of the second body portion has a third concave area, such that the third protrusion extends into the third concave area when the first and second body portion are in the first configuration and the third protrusion and the width of the spring arm is too wide to pass a third edge of the second recess without compression of the spring arm. Optionally, the third portion of the spring arm has a fourth protrusion and a corresponding portion of the second body portion has a fourth concave area, such that the fourth protrusion extends into the fourth concave area when the first and second body portion are in the first configuration and the fourth protrusion and the width of the spring arm is too wide to pass a fourth edge of the second recess without compression of the spring arm. In another alternative, the second body portion has a circular shape. Optionally, the first body portion has a circular shape. Alternatively, the first body portion has a semi-circular cutout to accommodate the second body portion in the first configuration. Optionally, the second body portion has a pry area. In another alternative, the spring arm is attached to the first body portion at a first end via a pin, such that the spring arm rotates in respect to the first body portion. Optionally, the spring arm is attached to the second body portion at a second end via a pin, such that the spring arm rotates in respect to the second body portion. Alternatively, the spring arm rotates in respect to the first body portion to go from the first configuration to the second configuration. In another alternative, the bottom of the first second includes an adhesive. Optionally, the device holder is made of metal.

In one embodiment, a method of holding a device includes attaching a device holder to the back of a mobile device. The method further includes rotating a spring arm in relation to a first body portion to place the device in a first configuration. The method further includes resting the mobile device and the device holder on a first surface, an edge of the mobile device and a second body portion attached to the spring arm forming a stand. Alternatively, the method includes rotating the second body portion in relation to the spring arm to place the device in a second configuration and holding the device by placing fingers on either side of the spring arm between the first body portion and the second body portion. Optionally, a first portion of the spring arm has a first protrusion and a corresponding portion of the first body portion has a first concave area, such that the first protrusion extends into the first concave area when the first and second body portion and the first protrusion and a width of the spring arm is too wide to pass a first edge of the first recess without compression of the spring arm, and the method further includes compressing the spring arm to place the device holder in the first configuration. Alternatively, the first portion of the spring arm has a third protrusion and a corresponding portion of the second body portion has a third concave area, such that the third protrusion extends into the third concave area when the first and second body portion are in the first configuration and the third protrusion and the width of the spring arm is too wide to pass a third edge of the second recess without compression of the spring arm, and the method further includes compressing the spring arm to place the device holder in the second configuration.

DETAILED DESCRIPTION

Certain terminology is used herein for convenience only and is not to be taken as a limitation on the embodiments of the systems and methods for a flipout phone holder and stand ("flipout" or "device holder"). In many embodiments, the flipout includes a first and second body portion interconnected via a spring arm. The spring arm is an arm portion that is laterally compressible. This provides for the locking of the first and second body portion in multiple positions, as a result of the spring arm's compressibility.

Figure 1:
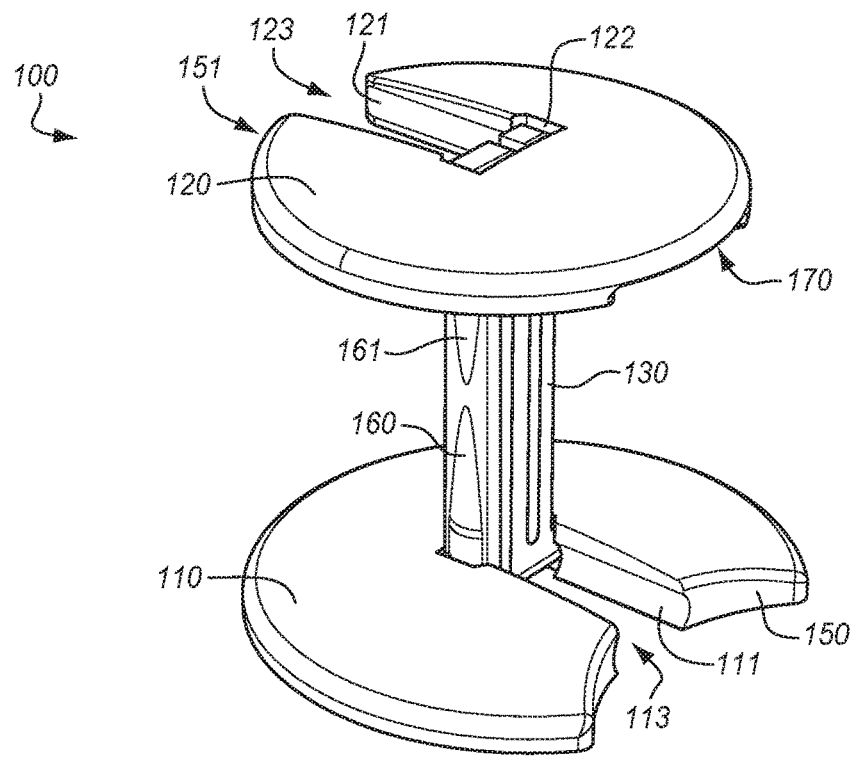
FIG. 1 shows one embodiment of a flipout phone holder and stand.

FIG. 1 shows one embodiment of a flipout 100 in an extended position. Flipout 100 includes a first body portion 110 and a second body portion 120. In the embodiment shown, the first body portion 110 and the second body portion 120 are generally circular. In alternatives, they can be virtually any other shape. As shown, body portion 110 has a cutout area 150 for interfacing with the second body portion at area 151. In this way, when the body portions are in a retracted position, the circles overlap. Different shapes may also be configured such that one body portion extends into a cutout into a second body portion when retracted. Alternatively, this cutout may be omitted and the body portions may merely abut when retracted. An advantage of using the cutout is that the second body portion may be larger as a result of the cutout. It may have more length in the direction of the spring arm 130.

Figure 3:
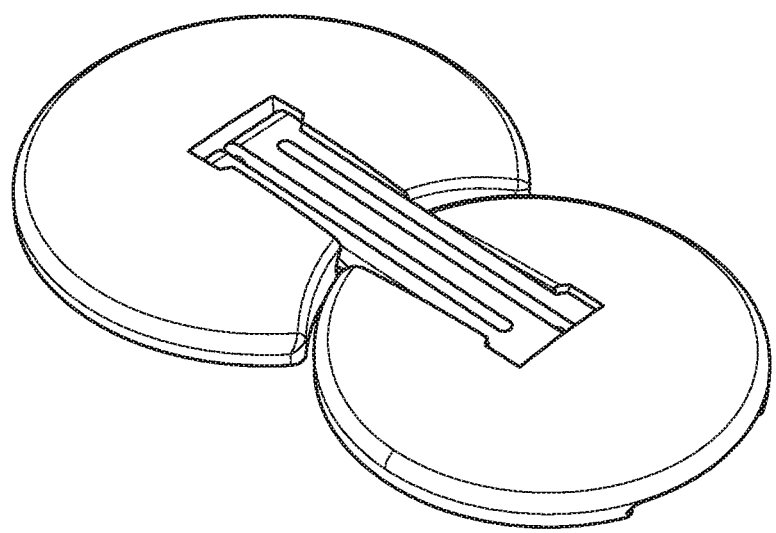
FIG. 3 shows another view of the flipout phone holder and stand of FIG. 1 in a retracted position.

As can be seen in FIG. 1, spring arm 130 connects the two body portions 110, 120. As can be seen, each body portion 110, 120, includes a cutout area or recess 113, 123 for accommodating the spring arm 130. These cutout areas 113, 123, include concave areas 121, 111 that correspond to the various protrusions 160, 161 on the spring arm 130. The cutout areas 113, 123 are slightly narrower than the width of the spring arm 130 including the protrusions 160, 161. Also visible, is pry area 170. Pry area 170 is located so a user can more easily get a finger nail under the surface of second body portion 120, such that when the flipout is in a retracted position, as in FIG. 3, it may be extended.

In this extended configuration, shown in FIG. 1, the user may place their fingers on either side of spring arm 130 and have them braced between first body portion 110 and second body portion 120.

Figure 2:
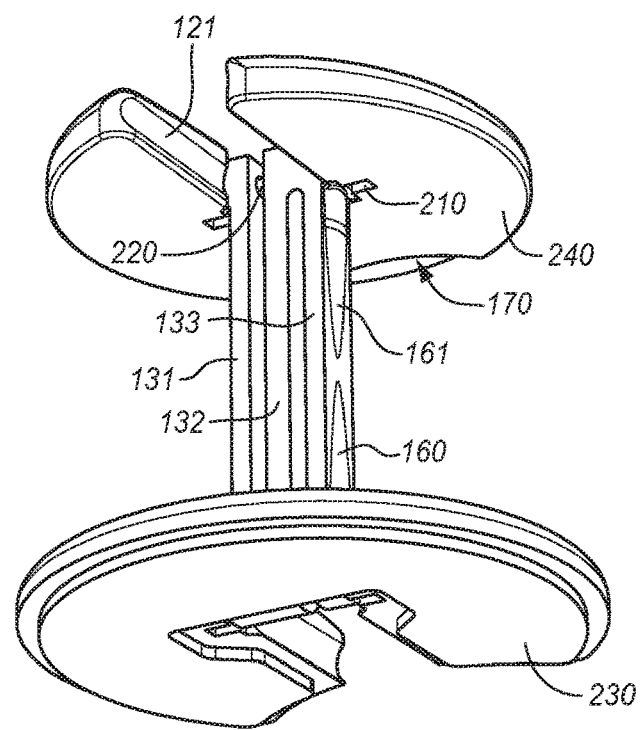
FIG. 2 shows another view of the flipout phone holder and stand of FIG. 1 in an extended position.
Figure 12:
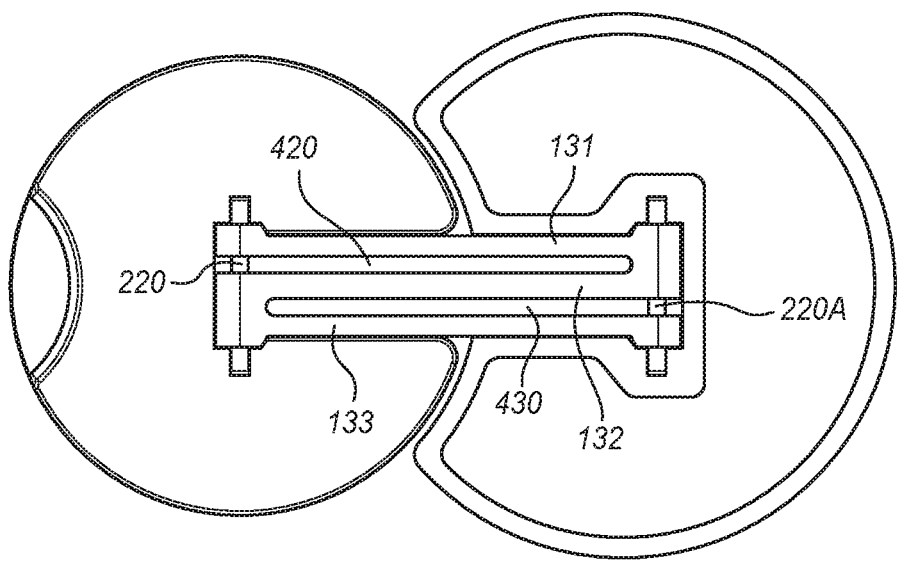
FIG. 12 shows another view of the flipout phone holder and stand of FIG. 1 in a retracted position.

In FIG. 2, the channel 210 for pin 220 can be seen in the under surface 240 of body portion 120 as well as the underside 230 of body portion 110. The underside 230 may include adhesive or other material in order to attach the flipout 100 to a mobile device such as a phone. Another pin 220a can be partially viewed in FIG. 12.

FIG. 2 shows a bottom perspective view of the spring arm 130. As can be seen, the spring arm 130 is made of essentially three portions, 131, 132, 133 that form an S or Z like shape. This spring arm 130 may compress in order to provide for the passage of protrusions 160, 161 by the edge of the cutout areas, 113, 123. In the retracted position, such as in FIG. 3, the protrusions 160, 161, expand into the concave areas 121, 111.

Figure 4:
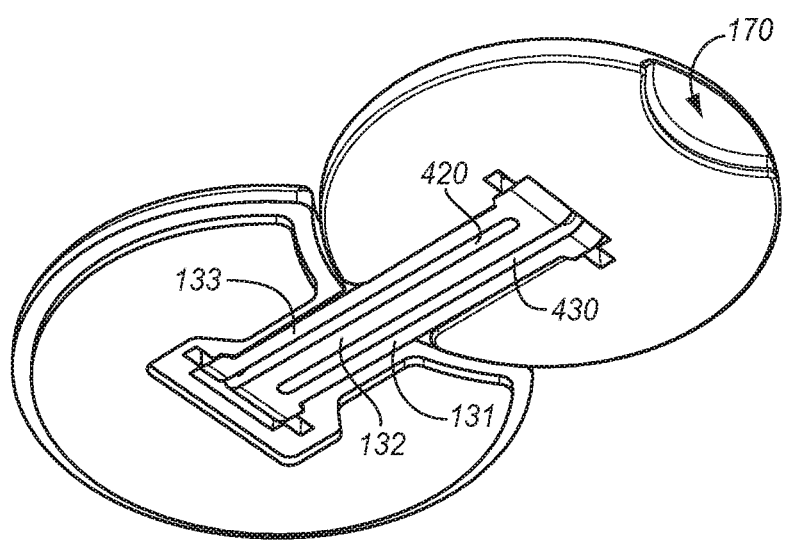
FIG. 4 shows another view of the flipout phone holder and stand of FIG. 1 in a retracted position.

FIG. 4 shows a bottom view of flipout 100 in a retracted position. In this position, cutout areas 420, 430 can be easily viewed. These cutout areas 420, 430 provide for the spring function of the spring arm 130.

Figure 5:
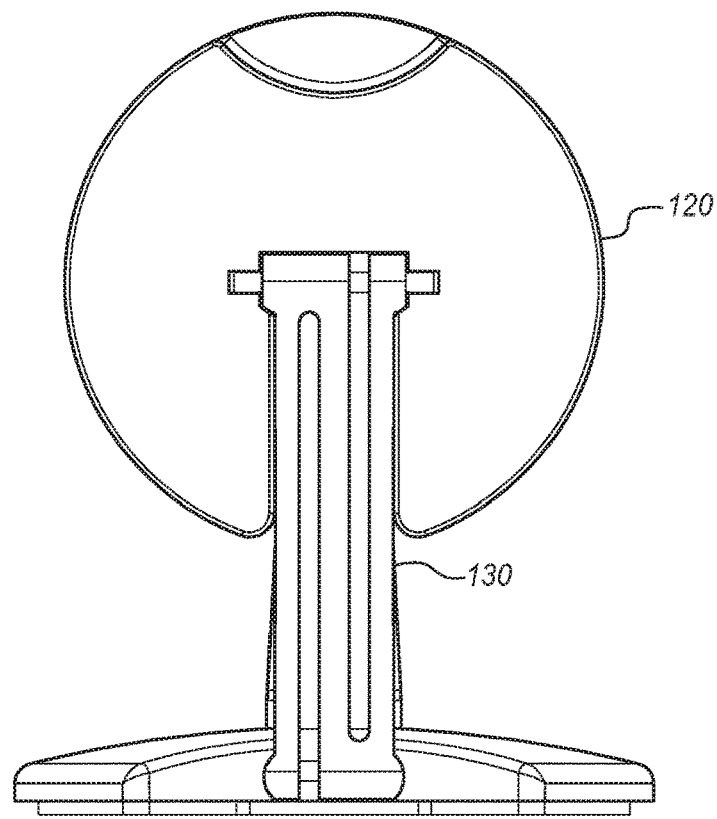
FIG. 5 shows another view of the flipout phone holder and stand of FIG. 1 in stand position.
Figure 6:
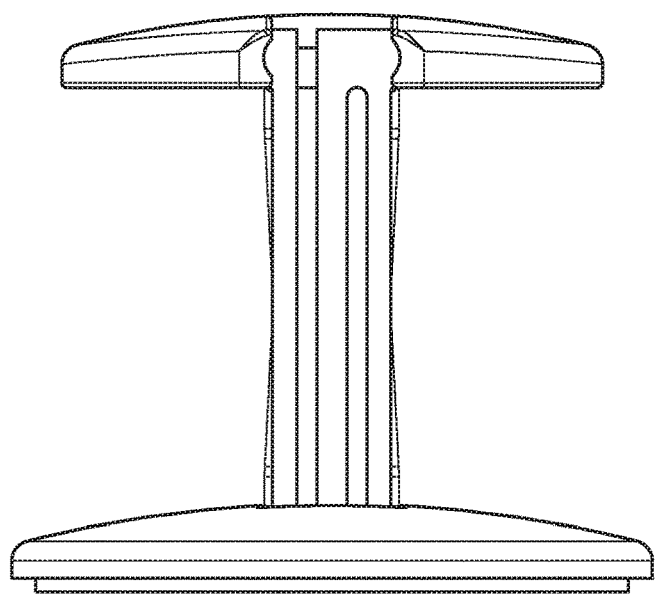
FIG. 6 shows another view of the flipout phone holder and stand of FIG. 1 in an extended position.
Figure 7:
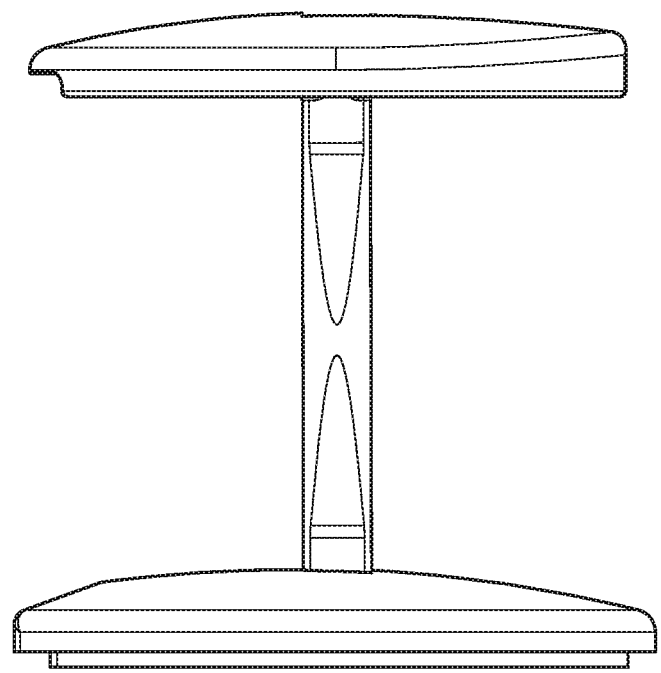
FIG. 7 shows another view of the flipout phone holder and stand of FIG. 1 in an extended position.
Figure 8:
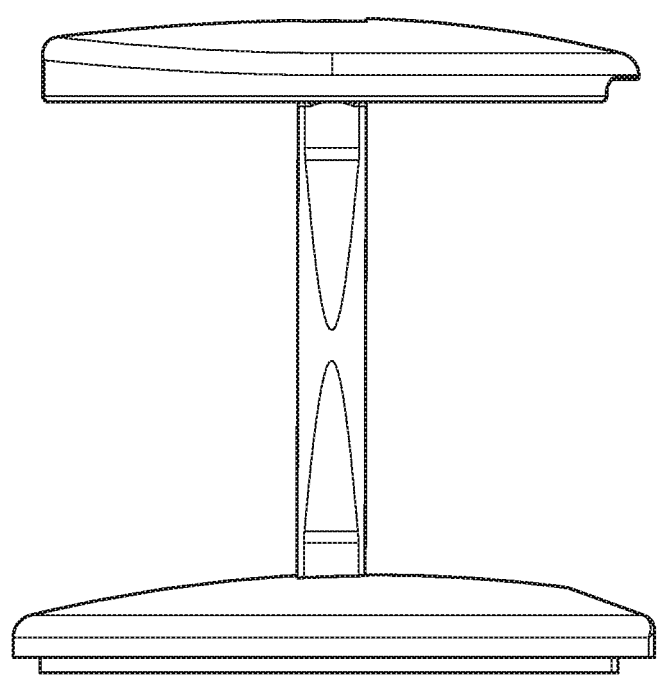
FIG. 8 shows another view of the flipout phone holder and stand of FIG. 1 in an extended position.
Figure 9:
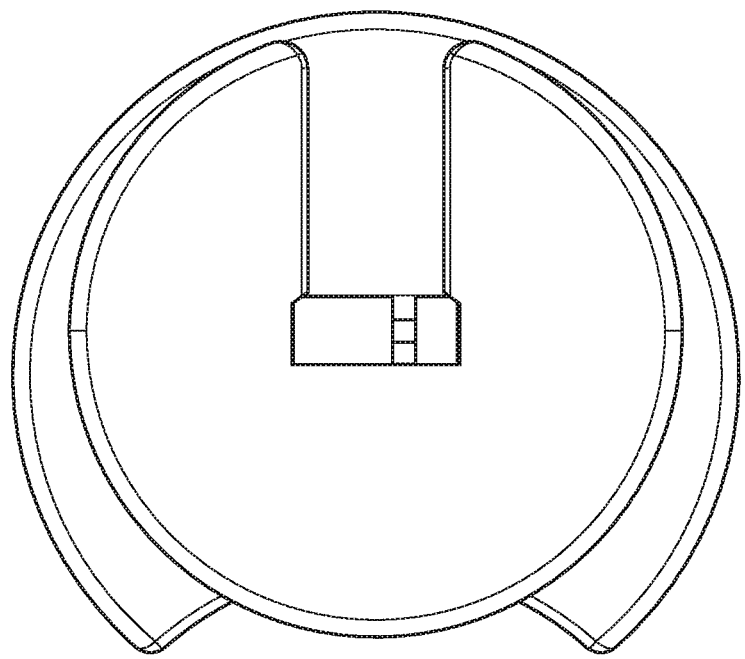
FIG. 9 shows another view of the flipout phone holder and stand of FIG. 1 in an extended position.
Figure 10:
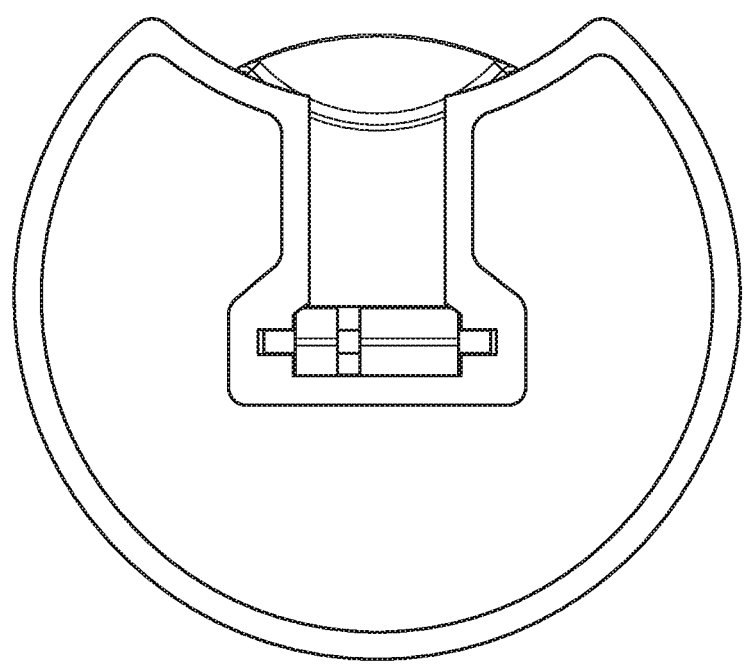
FIG. 10 shows another view of the flipout phone holder and stand of FIG. 1 in an extended position.
Figure 11:
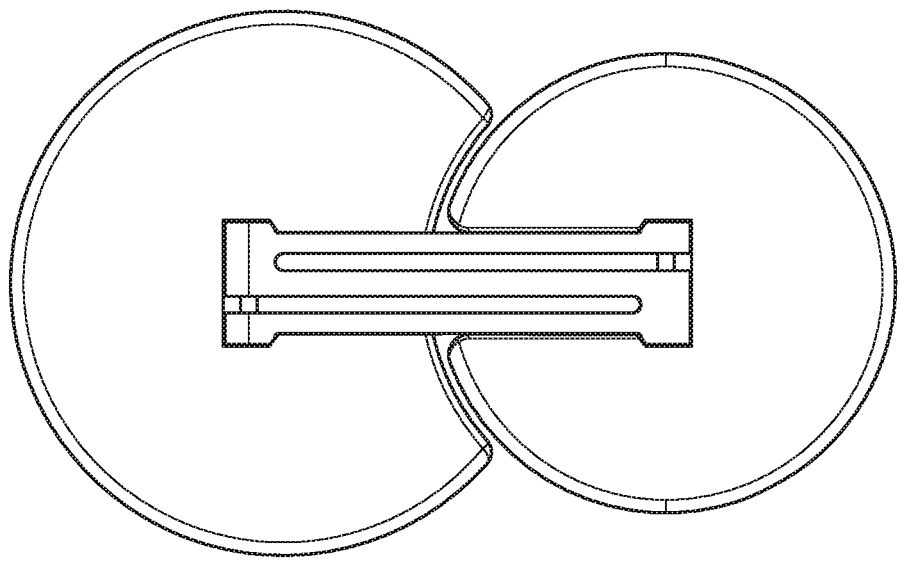
FIG. 11 shows another view of the flipout phone holder and stand of FIG. 1 in a retracted position.

FIG. 5 shows another configuration of flipout 100. In this configuration, the second body portion has not been rotated. In such a configuration, if the flipout 100 is attached to the back of a phone or other item, the second body portion 120 being extended serves to function as a stand, since the effect of the extension is to create a longer arm than if body portion 120 was perpendicular to spring arm 130. Additionally, the shape of second body portion 120 is advantageous, since it has a circular shape, since slight changes of pitch in the surface will still result in the device having good contact.

In many embodiments, the flipout 100 is made of metal, allowing from the spring arm 130 to flex and return to shape accordingly. Other materials may be used in alternatives.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A device holder, the device holder comprising:
    a first body;
    a second body; and
    a spring arm connecting the first body and second body together, the spring arm having a first end portion releasably retained within a first cutout area of the first body, and a second end portion releasably retained within a second cutout area of the second body, the first body and second body each having a first configuration where the spring arm is in the respective first and second cutout areas and a second configuration where the spring arm is out of the respective first and second cutout areas, wherein in order to change from the first configuration to the second configuration of each of the first body and second body, the spring arm compresses laterally inward through engagement of the respective body with the spring arm.

2. The device holder of claim 1, wherein the spring arm has a first, second, and third portions, the first and second portions separated by a first cutout area and the second and third portions separated by a second cutout area, such that when the spring arm compresses, the first and third portions flex relative to the second portion.

3. The device holder of claim 2, wherein the first portion of the spring arm has a first protrusion and a corresponding portion of the first body has a first concave area, such that the first protrusion extends into the first concave area when the first body is in the first configuration, the first protrusion and the first concave area defining a detent structure such that movement of the first body between the first and second configurations compresses the spring arm laterally inward.

4. The device holder of claim 3, wherein the spring arm includes an S-shape.

5. The device holder of claim 4, wherein the third portion of the spring arm has a second protrusion and a corresponding portion of the first body has a second concave area, such that the second protrusion extends into the second concave area when the first body is in the first configuration, the second protrusion and the second concave area defining a detent structure such that movement of the first body between the first and second configurations compresses the spring arm laterally inward.

6. The device holder of claim 5, wherein the first portion of the spring arm has a third protrusion and a corresponding portion of the second body has a third concave area, such that the third protrusion extends into the third concave area when the second body is in the first configuration, the third protrusion and the third concave area defining a detent structure such that movement of the second body between the first and second configurations compresses the spring arm laterally inward.

7. The device holder of claim 6, wherein the third portion of the spring arm has a fourth protrusion and a corresponding portion of the second body has a fourth concave area, such that the fourth protrusion extends into the fourth concave area when the second body is in the first configuration, the fourth protrusion and the fourth concave area defining a detent structure such that movement of the second body between the first and second configurations compresses the spring arm laterally inward.

8. The device holder of claim 7, wherein the second body has an arcuate shape.

9. The device holder of claim 8, wherein the first body has an arcuate shape.

10. The device holder of claim 8, wherein the first body has a semi-circular cutout to accommodate the second body in the first configuration.

11. The device holder of claim 10, wherein the second body has a pry area.

12. The device holder of claim 1, wherein the spring arm is attached to the first body at a first end via a pin, such that the spring arm rotates in respect to the first body to move the first body between the first and second configurations.

13. The device holder of claim 12, wherein the spring arm is attached to the second body at a second end via a pin, such that the spring arm rotates in respect to the second body to move the second body between the first and second configurations.

14. The device holder of claim 13, wherein the spring arm is rotatably connected to a central portion of the first body and rotatably connected to a central portion of the second body.

15. The device holder of claim 14, wherein a bottom of the first body includes an adhesive.

16. The device holder of claim 15, wherein the device holder is made of metal.

17. A method of holding a device, the method comprising:
attaching a device holder to the back of a mobile device, the device holder including a first body, a second body, and a spring arm connecting the first body and second body together, the spring arm having a first end portion releasably retained within a first cutout area of the first body and a second end portion releasably retained within a second cutout area of the second body;
rotating the spring arm in relation to the first body from a first configuration where the first end portion of the spring arm is in the first cutout area, to a second configuration where the first end portion of the spring arm is out of the first cutout area, wherein rotation of the spring arm relative to the first body compresses the spring arm laterally inward through engagement of the first body with the spring arm;
resting the mobile device and the device holder on a first surface, an edge of the mobile device and the second body forming a stand.

18. The method of claim 17, further comprising:
rotating the second body in relation to the spring arm from a first configuration to a second configuration;
holding the device by placing fingers on either side of the spring arm between the first body and the second body.

19. The method of claim 17, wherein a first portion of the spring arm has a first protrusion and a corresponding portion of the first body has a first concave area, such that the first protrusion extends into the first concave area when the first body is in the first configuration.

20. The method of claim 19, further comprising:
rotating the second body in relation to the spring arm from a first configuration to a second configuration; and
compressing the spring arm to place the second body in the second configuration, wherein the first portion of the spring arm has a second protrusion and a corresponding portion of the second body has a second concave area, such that the second protrusion extends into the second concave area when the second body is in the first configuration.

21. A device holder, the device holder comprising:
a first body portion having a first cutout area;
a second body portion having a second cutout area; and
a spring arm rotatably connected to the first and second body portions, the spring arm including first and second portions releasably retained within the first and second cutout areas, respectively,
wherein rotation of the first body portion relative to the spring arm selectively engages the first body portion with the first portion of the spring arm to compress the first portion of the spring arm laterally inward to releasably retain the first portion of the spring arm within the first cutout area, and
wherein rotation of the second body portion relative to the spring arm selectively engages the second body portion with the second portion of the spring arm to compress the second portion of the spring arm laterally inward to releasably retain the second portion of the spring arm within the second cutout area.

* * * * *